United States Patent Office 2,872,285
Patented Feb. 3, 1959

2,872,285

SOLVENT EXTRACTION OF URANIUM VALUES

Harold M. Feder and Milton Ader, Park Forest, and Laurids E. Ross, Naperville, Ill., assignors to the United States of America as represented by the United States Atomic Energy Commission No Drawing. Application September 6, 1956
Serial No. 608,408

12 Claims. (Cl. 23—14.5)

This invention deals with the separation of uranium values from aqueous solutions by solvent extraction.

It is an object of this invention to provide a process for the extraction of uranium values from aqueous solutions which does not require the presence of free acid.

It is another object of this invention to extract uranium values from aqueous solutions in a simple and efficient manner.

These objects are accomplished by contacting the aqueous solution containing the uranium values to be recovered with a substantially water-immiscible alkyl-substituted amide having at least 8 carbon atoms in the molecule, and separating a uranium-containing amide extract phase from a uranium-depleted aqueous phase.

The method of this invention can be applied directly to the leaching of uranium ores; to the processing of neutron-irradiated uranium-containing fuel elements by either extracting the so-called dissolver solution (the solution obtained by dissolving the uranium-containing fuel element in acid) or waste solutions obtained during the processing of the dissolver solution, e. g. by solvent extraction, in order to recover minor quantities of uranium that have escaped these recovery steps; and the process of this invention is also applicable to analytical determinations.

Amides of the general formula $R \cdot CO \cdot NR'R''$, wherein R, R', and R'' symbolize organic radicals, are suitable as solvents for the process of this invention; dialkyl-acetamides yielded the best results. The preferred solvent is di-n-butylacetamide which has the formula $CH_3 \cdot CO \cdot N:(C_4H_9)_2$; its vapor pressure is 9 millimeters of mercury at 114° C., its flash point is above 100° C., and its density at 25° C. is 0.8787 gram per milliliter.

While the amides can be used as such, a solution of them in a diluent is sometimes preferred. For the diluent any organic substantially water-immiscible liquid is suitable as long as it is a good solvent for the amide. Hydrocarbons, for instance, such as kerosene have been found useful. Carbon tetrachloride has also given very good results. The concentration of the amide in the diluent may vary widely. While, as set forth, the density of dibutylacetamide is 0.8787, a 55% (by volume)-solution of dibutylacetamide in carbon tetrachloride has a density of 1.1985 and a 30%-solution has a density of 1.3751 at 25° C. Most solutions in organic diluents have a lower viscosity than the amide alone which facilitates phase separation.

The process of this invention is operative with acid and neutral aqueous solutions. In the case that the uranium is present in the aqueous solution as a uranate, a low acid content, e. g. of nitric acid or hydrochloric acid, in the amide is necessary for satisfactory extraction. The presence of a salting-out agent is not necessary, but the extraction is considerably improved thereby. (A salting-out agent is an inorganic compound which is highly soluble in water and which, when added in sufficient amounts to an aqueous salt solution to be extracted, promotes the interchange of said salt into an organic solvent therefor.)

The process is satisfactorily operative from aqueous solutions which contain sulfate, phosphate, pyrophosphate, fluoride, carbonate, acetate or thiocyanate anions. It is understood that the extraction is excellent from nitrate, chloride or other mineral acid salt solutions.

Most fission product values are not extractable into the amides of this invention so that the process is very well suitable for the separation or decontamination of uranium from fission product values as will be shown later.

The uranium values can be back-extracted from the amide and the latter thereby be regenerated by means of an aqueous solution of a complexing agent; these aqueous solutions should have a pH value of at least 7. Carbonate, oxalate or citrate solutions, for instance, were found to be suitable stripping solutions. A saturated solution of ammonium carbonate yielded especially good results.

The dibutylacetamide ("DBA") forms a complex with the uranium salts. These complexes, for instance that having the formula $UO_2(NO_3)_2 \cdot 2DBA$, can be precipitated as anhydrous crystalline solvates either by evaporating the solution containing both, the uranium salt and the amide, or by adding the dibutylacetamide to an organic uranium solution followed by concentration, or by adding the dibutylacetamide to a concentrated aqueous uranium salt solution. At 25° C. the solvate was found to be soluble in an excess of dibutylacetamide to an extent to form a solution of a concentration of 0.65 M. The solvates may be purified by recrystallization from hot petroleum ether.

In the following a few examples are given which illustrate the operativeness of the process of this invention.

Example 1

A 0.77 M uranyl nitrate hexahydrate solution which was free from acid and salting-out agent, was contacted in a single-batch operation with an equal volume of dibutylacetamide. Analysis showed that 98% of the uranium had been extracted into the organic phase.

Example 2

The uranium was extracted from an aqueous uranyl nitrate "feed" solution by contacting it countercurrently with a solution of dibutylacetamide in carbon tetrachloride. The extraction system had nine stages, five for extraction and four for scrubbing.

The feed solution was 2 M in uranyl nitrate and 0.2 M in sodium hydroxide; the extractant consisted of a carbon tetrachloride solution containing 55% by volume of the solution of dibutylacetamide and also nitric acid in a concentration of 0.1 M. Water was used as the scrubbing medium. The volume ratio of feed:extractant: scrub was 4:1:1.

An extract phase about 0.6 M in uranyl nitrate was obtained; it contained no acid and practically all of the uranium. The aqueous raffinate contained sodium nitrate and nitric acid and uranium in a concentration below the limit of colorimetric determination which is less than $10^{-5}$ M.

Example 3

This example represents a comparison of extraction with dibutylacetamide according to this invention with that with tributyl phosphate. Both, the amide and the phosphate, were dissolved in a kerosene diluent using 30% by volume of the amide and phosphate, respectively, and 70% by volume of kerosene diluent.

A 0.01 M uranyl chloride feed solution which had been obtained by dissolving a neutron-bombarded uranium fuel element in a mixture of hydrochloric acid and hydrogen peroxide was used for the two parallel runs. Equal volumes of feed solution and extractant were contacted in a single-pass batch operation. The results of the two runs are tabulated in the table below:

|  | Solvent | |
| --- | --- | --- |
|  | Tributyl-Phosphate | Dibutyl-acetamide |
| $MgCl_2$ in feed solution, M | 2.30 | 1.75 |
| Distribution ratio for uranium, organic/aqueous | 7.1 | 10 |
| Fission product separation factors:[1] | | |
| Gross beta | 1,000 | 600 |
| Gross gamma | 120 | 350 |
| Ruthenium | 30 | 20 |
| Zirconium+Niobium | 60 | 270 |

[1] Separation Factor =
$$\frac{\text{Distribution Ratio for Uranium, Organic/Aqueous}}{\text{Distribution Ratio for Fission Products, Organic/Aqueous}}$$

It is obvious from the results of the two runs that dibutylacetamide is superior to tributyl phosphate and that a higher uranium extraction is obtained with a lower concentration of salting-out agent ($MgCl_2$). Likewise, the separation of uranium from the fission products was better with the solvent of this invention than with the tributyl phosphate with the exception of ruthenium.

It will be understood that this invention is not to be limited to the details given herein but that it may be modified within the scope of the appended claims.

What is claimed is:

1. A process of extracting uranium mineral acid salts from an aqueous solution having a maximum pH value of 7, comprising contacting said aqueous solution with a substantially water-immiscible dialkylacetamide having at least 8 carbon atoms in the molecule, and separating a uranium values-containing organic phase from a uranium-depleted aqueous phase.

2. The process of claim 1 wherein the dialkylacetamide is dibutylacetamide.

3. The process of claim 1 wherein the amide is dissolved in a diluent.

4. The process of claim 3 wherein the diluent is carbon tetrachloride.

5. The process of claim 3 wherein the diluent is kerosene.

6. A process of extracting uranium mineral acid salts from an aqueous solution having a maximum pH value of 7, comprising contacting said aqueous solution with a substantially water-immiscible dialkylacetamide having at least 8 carbon atoms in the molecule, separating a uranium values-containing organic phase from a uranium-depleted aqueous phase, and recovering said uranium values from said organic phase.

7. The process of claim 6 wherein the step of recovering uranium values from the organic phase is carried out by contacting the organic phase with an aqueous solution of a complexing agent having a pH value of at least 7, and separating an aqueous uranium complex-containing aqueous phase from a regenerated organic phase.

8. The process of claim 7 wherein said aqueous solution of a complexing agent is a saturated solution of ammonium carbonate.

9. The process of claim 6 wherein the step of recovering uranium values from the organic phase is carried out by concentrating said organic phase by evaporation whereby a crystalline uranium-containing precipitate forms, and separating said precipitate from said organic phase.

10. A process of recovering uranium mineral acid salts from an organic solution, comprising adding dibutylacetamide to said solution, concentrating said solution by evaporation until a uranium-containing precipitate forms, and separating said precipitate from said concentrated solution.

11. A process of separating uranium mineral acid salts from fission product values contained in an aqueous solution, comprising adjusting the pH value of said aqueous solution to a maximum value of 7, contacting said solution with dibutylacetamide whereby said uranium salts are preferentially extracted into said dibutylacetamide while said fission product values preferentially remain in the aqueous solution, and separating a dibutylacetamide phase from said aqueous solution.

12. A process of extracting a uranium mineral acid salt from an aqueous solution having an maximum pH value of 7, comprising contacting said aqueous solution with a solution of dibutylacetamide in carbon tetrachloride, separating a uranium-values-containing organic phase from a uranium-depleted aqueous phase, recovering said uranium values from said organic phase by contacting it with an aqueous solution of a complexing agent having a pH value of at least 7 whereby an aqueous uranium-complex-containing phase is formed, and separating said uranium-complex-containing aqueous phase from a regenerated organic phase.

References Cited in the file of this patent

AECD–4142, Brown et al., May 27, 1954, issued June 9, 1954. (Available from OTS, Commerce Dept., Washington 25, D. C.)

BMI–JDS–146, Bearse et al., Oct. 10, 1948, Declassified Mar. 5, 1956. (Available from OTS, Commerce Dept., Washington 25, D. C.)

ORNL–1998, Guyman et al., No. 15, 1955, issued June 29, 1956 pp. 6, 13–20.